United States Patent [19]

Mardon

[11] Patent Number: 4,862,012

[45] Date of Patent: Aug. 29, 1989

[54] ELECTRICAL SWITCHING APPARATUS

[75] Inventor: Paul F. Mardon, Fulbourn, Great Britain

[73] Assignee: Pulsar Light of Cambridge Limited, Great Britain

[21] Appl. No.: 158,586

[22] Filed: Feb. 22, 1988

[51] Int. Cl.4 .............................................. H02J 1/00
[52] U.S. Cl. ...................................... 307/38; 307/40; 307/41
[58] Field of Search .............................. 307/38, 40, 41

[56] References Cited

U.S. PATENT DOCUMENTS

| 4,307,302 | 12/1981 | Russell | 307/40 |
| 4,443,709 | 4/1984 | Genuit et al. | 307/41 |
| 4,471,232 | 9/1984 | Peddie et al. | 307/38 X |
| 4,642,473 | 2/1987 | Bryant | 307/38 |

Primary Examiner—William M. Shoop, Jr.
Assistant Examiner—Sharon D. Logan
Attorney, Agent, or Firm—Oldham & Oldham

[57] ABSTRACT

A system for selectively operating a plurality of appliances connected in parallel with one another and with a power supply via single cable which carries control signals of differing characteristics generated from a control signal source, wherein each appliance has an associated control device also powered from the power supply, said control devices being connected in series to provide a control signal-carrying line thereof, and each appiance control device has means for discriminating between control signals of different characteristics and has means for routing the control signals accordingly so that one or more selected appliances are operated in dependence on the characteristic of an arriving signal.

15 Claims, 6 Drawing Sheets

Fig.6

ELECTRICAL SWITCHING APPARATUS

FIELD OF INVENTION

This invention concerns electrical switching apparatus and in particular apparatus for switching electrical appliances from a remote position. The invention is of particular application to lighting systems where each appliance comprises a flashlamp and electrical signals are supplied to the system to cause the lamps to flash for example in a controlled sequence. However the invention is not limited to such applications and is of general application in the field of telemetry and remote switichiing.

BACKGROUND TO THE INVENTION

It is known to link electrical appliances in a chain-like manner and cause the appliances to be switched remotely. This can be achieved either by remote control using radio signals, multiple wiring from a central control unit or by using a common power supply linking the appliances and at least one control lead with appropriate cooling of information along the latter with decoding devices at each appliance.

The solutions hitherto are not particularly suited to lighting systems particularly those for discotheques and the like where it is desirable that the number of conductors between each lamp is kept to the minimum and where preferably a standard three core cable is to be used for interconnecting the various lights.

In addition, previous solutions have tended to be dedicated to a particular number of appliances along the chain and any reduction or increase in the number of appliances would result in failure of the system to recognise the change. Again in installations such as discotheque lighting and the like it is desirable that the greatest possible flexibility is provided and where long strings of lights which are to be switched in sequence are required, this flexibility is of paramount importance.

It is therefore an object of the present invention to provide a lighting system and control unit therefor which can be applied to theoretically any number of appliances for switching the latter remotely and in which a reduction or increase in the number of appliances in the chain does not alter the ability of the system to cope and maintain full control.

It is another object of the invention to provide a system in which only three cables are required so that a standard three core cable can be used in which the live and neutral cables supply power to the appliances and the so-called earth cable is used to convey switching and control signals to the appliances. It is a further object of the invention to provide a system in which the appliances can be caused to switch in sequence beginning at one end or the other of the chain or selectively beginning at both ends of the chain simultaneously and moving in opposite directions towards the opposite ends of the chain.

It is a further object of the invention to provide such a system in which the switching speed is controllable and in which the switching sequence can be effected to begin from either or both ends of the chain, the switching rate in both directions being independently selectable.

It is a further object to provide a system in which a switching pulse delivered to one end of the chain of appliances can be returned (or reconstituted and returned) to the sending end after it has actuated the last appliance in the chain, or, some defined appliance.

SUMMARY OF THE INVENTION

According to one aspect of the present invention in an electrical system comprising a power supply and a source of control signals for selectively operating plurality of appliances each of which is connected in parallel with the other appliances and the power supply and in which a single wire is employed linking the appliances to the source of control signals, there is provided for each appliance a control unit, powered from the power supply, and an input terminal and an output terminal whereby the control units are connected in series with the output terminal of one control unit being connected to the input terminal of the next and the input terminal of the first control unit being connected to the source of control signals, no connection being made to the output terminal of the last control unit in the chain, and each control unit includes discriminator means and routing means whereby electrical signals having one characteristic can be distinguished from and routed separately from electrical signals having other characteristic, thereby to cause a signal having a particular characteristic to actuate only a selected one or ones of the appliances.

Conveniently the electrical control signals are distinguished according to amplitude or frequency.

The invention will be described in general, in relation to pulses of differing amplitude. However by using frequency selective circuits, signals of different frequency can be just as easily selected and routed.

In one embodiment the routing means is arranged to route signals of a first amplitude through circuit means contained within each control unit from the input to the output and in so doing trigger a bistable device in the control unit into one mode, so that the arrival of a subsequent pulse of second amplitude triggers it into its other mode and in so doing is arranged to cause operation of the appliance and generate a signal of desired amplitude for transmission from the output of the unit to the input of the next unit. In this way a single pulse of first amplitude applied to the input of the first control unit can be transferred from the first unit to the next and so on along the chain by the subsequent application of signals of a second amplitude to the input of the first device. By arranging that the first amplitude pulse is regenerated before being transmitted by each unit no degradation occurs and the transmitted pulse may be of the first amplitude or another amplitude.

In this manner, for example, each appliance can be activated in turn along the chain, the timing of the activations being determined by the subsequent pulses of second amplitude.

Conveniently, pulses of the second amplitude are instantaneously routed by each control unit directly from input to output so that these subsequently occurring signals are applied simultaneously to all of the appliances along the chain. In this connection the transfer of these pulses is of course subject to the transit time (i.e. transmission delay) along the line, but except for very high frequency operation, such transit times can be ignored.

According to a preferred feature of the invention, each control unit is capable of distinguishing between at least two different types of first amplitude signal typically on the basis of phase, and each control unit includes routing means whereby a first amplitude signal of one phase is treated as before described but a first amplitude signal of a different phase is routed directly from input to output of the control unit in exactly the same way as the said subsequent second amplitude signals are routed.

Preferably each control unit includes circuit means which recognises whether or not a subsequent control unit has been connected to the output thereof, and routing means is exists within the control unit in the event that the control unit is the last unit in the chain (i.e. no input is connected to its output) whereby the arrival of a second type of first amplitude signal at the last unit causes the re-generation of a first amplitude signal within the last unit, which is then caused to be transferred from one unit to the next in the reverse direction along the chain to return to the source of control signals, in a series of steps, dictated by the arrival at the first unit of successive signals of said second amplitude.

This returning signal may for example be used as a check to ensure that all of the units along the chain have worked satisfactorily and are present and correctly connected.

Alternatively or in addition, the returning pulse can be used to cause actuation of each appliance connected to each control unit so that if desired, the appliances can be operated in sequence beginning at the remote end of the chain and travelling homewards.

Where it is required that the returning pulse shall be controlled in the same manner as an outgoing pulse along the chain, the control units are also rendered capable of distinguishing between subsequent second amplitude pulses of one phase and subsequent second amplitude pulses of another phase. By arranging that the said subsequent second amplitude pulses of one phase cause a first amplitude pulse having a first phase position to be moved in an outward direction along the chain, so second amplitude pulses within the second phase can be used to transfer a first amplitude pulse in the second phase (which has been transmitted though the units to the far end of the chain) to be moved unit by unit back along the chain towards the source.

Since the rate at which either of the first amplitude pulses is shifted along the line in either direction is governed by the subsequent second amplitude (of appropriate phase) pulses, it is a simple matter to alter the pulse repetition rate of the second amplitude pulses in the first or the second phase or in both so as to control the rate at which a first amplitude pulse either travels down the chain from the source or travels from the far end of the chain back towards the source.

It is of course not necessary that the repetition rate(s) remain constant but may be varied during the passage of a pulse from one end of the chain to the other if desired.

As applied to a lighting system, each appliance conveniently comprises a gas filled discharge tube i.e. flashtube and a large electrical capacitor is provided in conjunction with each flashtube in manner known per se, and is maintained in a charged state by permanent connection to the power supply via a charging circuit, and a trigger signal for the flashtube is generated by the control unit associated with the appliance when a first amplitude pulse is received by the control unit which in accordance with the routing and discrimination circuitry in the control unit is identified as being a pulse which is to cause the lamp to flash.

In accordance with another aspect of the invention, the source of control signals may comprise one or more signal generators which are adjustable to produce pulses at particular repetition rates and accurately phased relative to one another.

Since it is important that the pulses are capable of being distinguished from one another the signal generators must be capable of delivering pulses of appropriate amplitude as well as appropriate phase and timing.

Alternatively, the signal generators may be replaced by a microprocessor controlled device in which digital or analogue numerical values are used to determine the repetition rate of pulses delivered by a clock controlled microprocessor and in which a memory contains an operating system of commands which are selectable by operating switches or the like associated with the apparatus. The advantage of a software driven clock controlled microprocessor based device is that changes can be made in the mode of operation by altering the software commands instead of having to alter the wiring of a hardwired signal generator.

Although described in relation to sequentially switched lamps particularly flashlamps, the invention is not in any way limited to such applications and can be used for switching any linked appliances to which power is supplied by one pair of cables and to which control signals are supplied by a third cable.

According to another aspect of the invention a method of operating one or more of a plurality of appliances for example in sequence, which interconnected by a common signal line, comprises the step of supplying electrical pulses of a first type during a first period of time and routing each said first pulse in a stepwise fashion through each of the series connected devices by the subsequent application of timing pulses to the signal line, which timing pulses are arranged to occur in a strict phase relationship to the first pulse, and to each other.

The method can be extended to enable different units to be selected by a process of time multiplexing in which a second period of time is defined which is fixed in time relative to the first period of time and a second control signal is transmitting during the said second period of time and the second control signal is caused to be transferred from one unit to the next upon the application of timing pulses during the said second period of time and during subsequently recurring second periods of time, each of which is strictly phase related to the first occurring second period and likewise phase related to each subsequently occurring second periods of time.

There is no limit to the number of channels which can be so generated but according to a preferred aspect of the present invention, the sinusoidal alternating current mains may be employed as a standard of reference and it is particularly convenient to divide each whole cycle of the sinusoidal waveform into a power cycle (corresponding for example to the positive going excursion of the supply voltage) and a control signal cycle, which is arranged to occur simultaneously with the negative going excursion of the supply voltage. The positive going excursions can be channeled via diodes or the like to charge capacitors and provide direct current both as a power supply for the circuit means associated with each control unit and as a source of power for a lamp or other appliance which is to be driven from the power leads. If an alternating current device is required, the full alternating cycle applied to the power lead is of course available. If so then it is probable that two cables may be required for supplying control signals since it may not be possible in that circumstance to use the neutral line of the live and neutral pair providing the power supply as a return path for the control signals.

Where the appliances are d.c. driven or can be connected to the alternating current supply via a blocking diode so as to not draw current during the negative going half cycle of the alternating current supply, the neutral lead can be used as the return for a control signal supply line, separately supplying control signals to each of the plurality of control units each of which is associated with one of the appliances. Each control circuit includes a synchronising circuit means to define accurately the periods of time within which the negative half cycles of the mains supply occur and a further toggle circuit so as to divide the negative half cycle period into two equal parts with the division occuring for example at the maximum negative excursion of the mains voltage. Such an arrangement enables two channels of information to be supplied, one during the first half of the negative going half cycle and the second during the second half of each negative going half cycle.

If more channels are required, either the next occurring negative going half cycles are also subdivided, but ignored for the purpose of the first and second channels, thereby defining third and fourth channels etc, or each negative going half cycle may be divided into three or four or more separate compartments on a time basis so as to define a series of time slots during each negative going half cycle of the mains supply during which different control signals can be supplied to the signal cable leading to the control units. By providing synchronised switching in association with each unit, so each of the control units may for example be rendered unresponsive to information arising on any except one of the channels or in a simple two channel situation, signals in one channel can be routed directly to the remote end of the chain of control units so that such signals are then stepped in a backwards or reverse direction towards the source of signals in response to subsequent timing pulses, whereas control pulses belonging to the other channel are simply stepped in the ordinary forward direction down the line away from the source, by the subsequent timing pulses.

It will be seen that the invention lies in a combination of an adjustable source of pulses each of which can be defined in time in relation to other pulses generated therefrom and also in relation to the phase of an alternating current supply which is common to both the source of pulses and the receiver units associated with the various appliances which are to be switched.

Disregarding any phase shifts which might occur along the length of any supply cables, it will be seen that the system relies on the synchronisation achieved by defining periods of time relative to certain parts of the alternating current supply waveform. Where control pulses have to be transferred from one end of the line to the other and where the line length is considerable, it may be appropriate to include repeaters, at each or some of the units such as monostable repeaters which reconstitute the pulse from the leading edge of each received pulse so that no degradation of pulse width occurs as a pulse is transferred from one unit to another down the line. This may be applied to both control pulses and timing pulses and can be applied in both directions.

It will also be observed that it is possible to consider two control pulses being launched virtually simultaneously (i.e. during the same half cycle of the alternating current supply), one control pulse travelling to the far end of the line and the other serving to initiate the operation of the nearest appliance to the source of control pulses. Subsequent timing pulses will simply cause both contol pulses to be effectively transferred towards the opposite ends of the line from which they start, crossing over at some intermediate position which will be dictated by the relative frequency of the two trains of timing pulses. If both have the same frequency the control pulses will cross over at the half way point whereas if the frequencies are different, the cross over will occur at some different point other than the centre point of the line.

In describing the pulses as travelling along the line from one control unit to the other it is to be understood that each control unit may store each pulse and literally transfer the stored pulse along the line when triggered to do so, or more conveniently, the arrival of a control pulse at a control unit can serve to arm a pulse generating circuit within the control unit which is then triggered by the arrival of the next timing pulse to deliver an appropriate electrical signal to the input of the next unit along the line. In this way each control pulse can be thought of as being reconstituted by each unit which can therefore be thought of as a repeater rather than a simple direct connection.

The invention will now be described by way of example, with reference to the accompanying drawings in which.

DETAILED DESCRIPTION OF THE ILLUSTRATED EMBODIMENT

Figure 1:
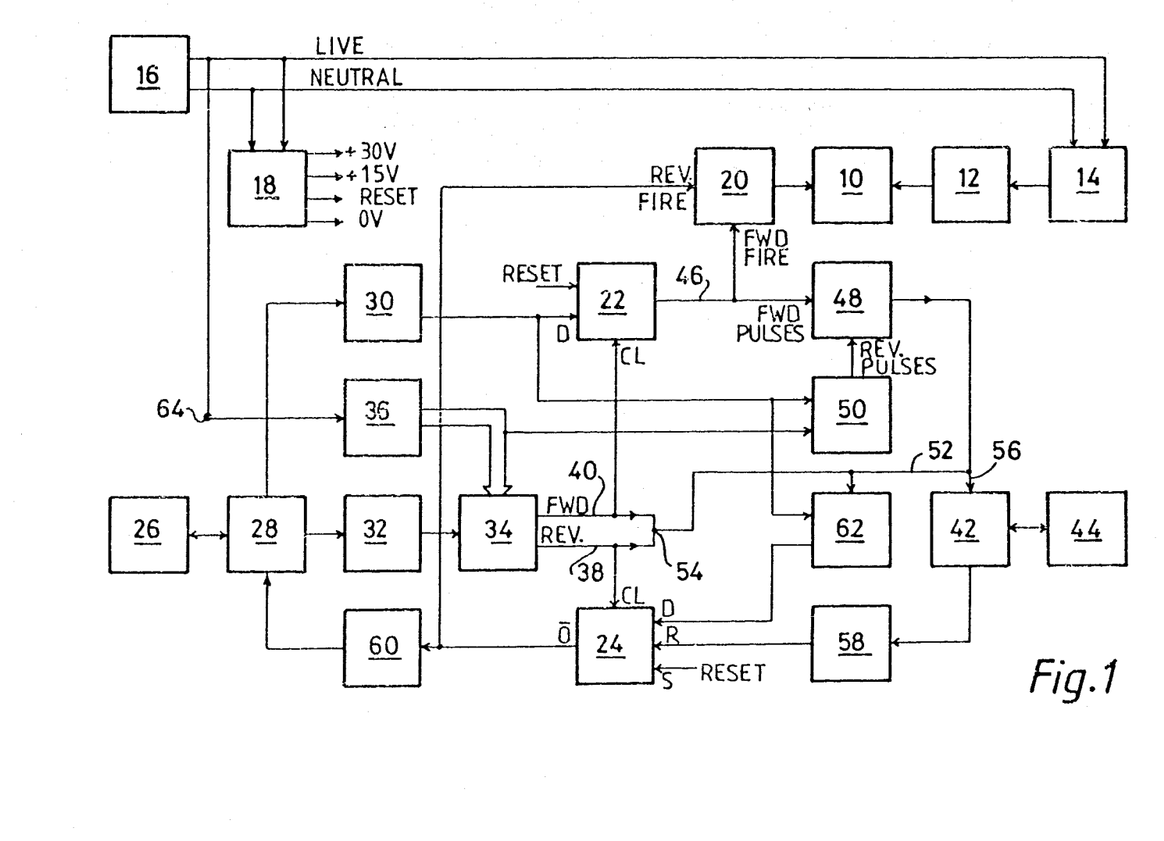
FIG. 1 is a block schematic diagram of a control unit for use in a sequentially switched flash lamp chain, embodying the invention.

Referring to FIG. 1, a flash tube 10 is powered by a capacitor circuit 12 which is kept fully charged by a rectifying circuit 14 powered from an alternating current supply 16. The latter also drives a power supply 18 which provides +30 v, +15 V, and Reset voltage for the remainder of the circuit.

The flash tube 10 is triggered by signals from a triggering circuit 20 which can be actuated by a forwardly travelling firing pulse from a bistable device 22 or a reverse travelling firing pulse from a second bistable device 24.

30 v firing pulses and 15 v clock pulses are supplied to an input terminal 26 and are separated by separator 28. Each 30 v firing pulse from 26 is detected by the detector 30 to provide an input signal for the data input of the bistable device (such as a shift register) 22.

15 v clock pulses belonging to both channels from 28 are detected by detector 32 and delivered to a clock pulse separator 34, which operates to separate the clock pulses of the one channel from those of the other channel. This is achieved by generating gating signals defining two windows during each negative going half cycle of the alternating current supply 16, by connecting the "live" of the supply 16 to an input of a window generating circuit 36. The window defining signals from 36 are supplied as gating signals to the separator 34, so that timing pulses occurring during the first of each pair of windows occurring during each negative half cycle appear as signals along line 38, and serve as clock signals for the bistable device 24, whilst those occurring during the second of each pair of windows, appear as signals along the line 40 and serve as clock signals for the bistable device 22.

The two sets of signals are combined (in a manner which will not allow those from one channel to appear at the clock input of the other channel bistable device), and are supplied to an output-input signal separating circuit 42 which supplies, and is supplied by, an output terminal 44 in a manner to be described.

It is to be noted that although terminals 26 and 44 have been described as input and output terminals respectively, they only serve in this capacity for firing pulses and timing pulses arriving at terminal 26 from the source, or a preceeding control unit output terminal, such as 44. Since the circuit is also capable of reacting to firing pulses which arrive at terminal 44 from a following control unit, so as to transfer the pulse to its input terminal 26, the terminals 28 and 44 can be thought of as input/output and output/input terminals respectively.

The bistable device 22 is only clocked during a so-called forward window, as defined by the synchronised gating circuit 36. Any firing pulse appearing at its data input during a "reverse" window is thus not "seen" by the bistable and the latter does not change state. However any firing pulse appearing at the data input of 22 during a so-called "forward" window will cause the bistable 22 to be SET causing the output line 46 to go HIGH, when the clock pulse derived from the 30 v firing pulse appears at 40. The Low to High transition is detected by the triggering circuit 20 so that the tube 10 is fired as the bistable 22 is set. The next 15v pulse to arrive at 26 during a "forward" window appears as a further clock pulse at 40, but since this will occur during a period for which there is no corresponding signal from 30, this further clock pulse will Reset the bistable 22, causing its output to go LOW. This HIGH to LOW transition is detected by a pulse generating sender circuit 48, for supplying a firing pulse to the separator 42 to be routed thereby to the output terminal 44.

Although firing pulses occurring at 26 during "forward" windows are intended to trigger the tube 10 during their "passage" through the circuit, firing pulses occurring during "reverse" windows, must be transferred immediately to the output 44 and to this end all firing pulses appearing at 26 cause pulses to appear at one input of a gate 50 whose other input is supplied with signals defining the "reverse" windows. Firing pulses coincident with "reverse" windows thus transfer to the sender 48 and immediately appear at the output 44.

In this way 30 v firing pulses arriving at 26 during forward window are stored in the circuit and are only released to fire the tube 10 and for transfer to the next circuit input, upon the arrival of the next following 15 v clock pulse at the input 26. On the other hand, 30 v firing pulses arriving at 26 during a reverse window are immediately transferred to the output 44. 15 v clock pulses (whether occurring during forward or reverse windows) generate corresponding clock pulses at the output 44 via separator 42 by means of the direct connection 52 from the junction 54 at the input of the separator 42.

The separator 42 serves as a routing circuit whereby firing and clock pulses appearing at its input 56 are transferred to the output terminal 44, whilst any firing pulses appearing at the terminal 44 from a following control unit (after being generated in a manner to be described), are routed to the input of a detector 58. The latter produces a Reset signal for the bistable device 24 the $\bar{O}$ output of which constitutes the input for a sender circuit 60. This generates a firing pulse which is routed by the separator 28 to the input 26 rather than to the detectors 30 and 32.

The device 24 is clocked by any clock pulses which arrive at 26 during a reverse window, (via 28, 32, 34 and 38), but the $\bar{O}$ output tends to remain LOW since the Data input is connected to a circuit which provides a HIGH output at all times except when the unit forms the last one in the chain, when it goes LOW in the presence of a reverse firing pulse.

The sender 60 is only activated by a HIGH to LOW transition of the $\bar{O}$ output and this is brought about by the first reverse clock pulse to arrive after a reverse fire pulse.

The flash tube, 10, can be fired during the reverse window by a Low to High transition of the $\bar{O}$ output of 24 in either of two ways:

(1) If a firing pulse appears at 44 and is transferred via 42 to 58 during a reverse window, then the pulse applied to the RESET input of 24 will cause the $\bar{O}$ output to go HIGH until the next clock pulse (generated during a "reverse" window) to set the device.

(2) If the detector 62 has already determined that there is no input circuit of a following control unit connected to the output terminal 44, the arrival of a "reverse" firing pulse at separator 50 (from 30), will be transferred via 62 to the Data input of device 24, causing the ',ovs/O/ output to go HIGH when the clock pulse derived from it arrives. However the next clock pulse will force it LOW again in the absence of a LOW signal at the Data input.

Figure 2:
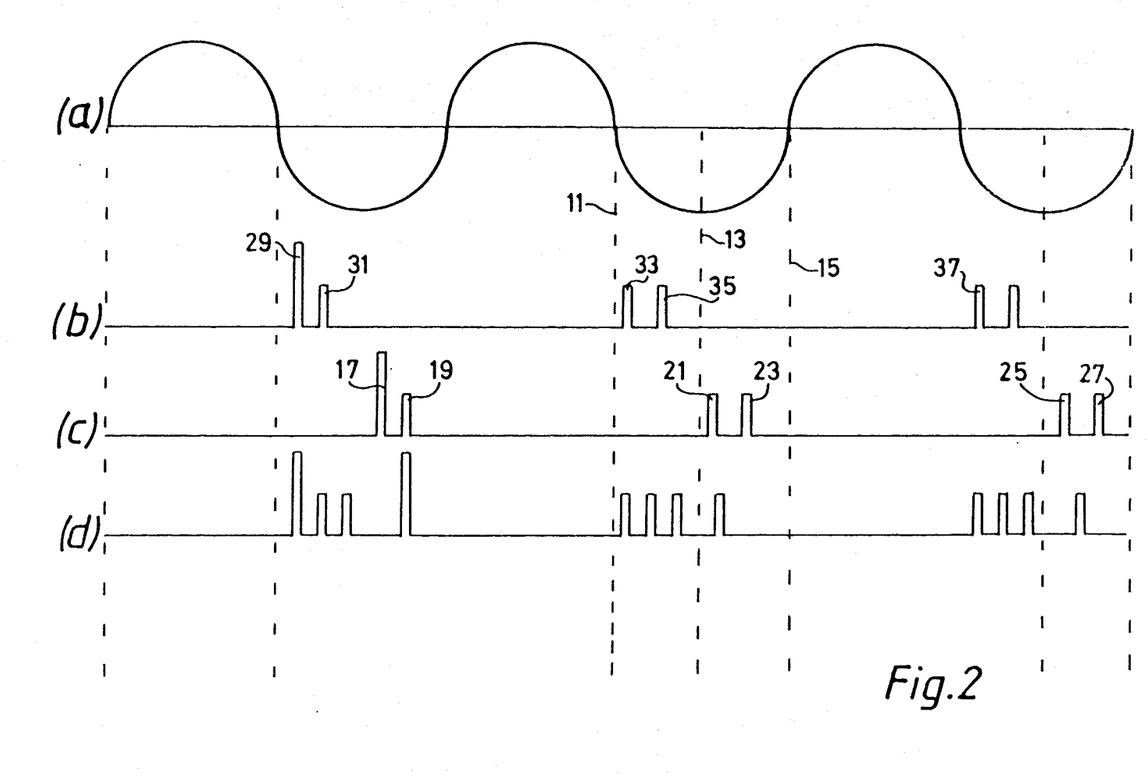
FIG. 2 is a timing diagram illustrating the synchronisation of the two control signal channels and the alternating current supply.

FIG. 2 is a waveform-timing diagram. At 2(a) is shown a representation of a sinusoidal alternating current waveform. Lines 11 and 13 define the first half of one of the negative half-cycles, whilst 13 and 15 define the second half of the same negative half-cycle of the supply waveform.

At 2(c) are illustrated the pulses which would typically appear at the begining of a pulse train, arranged to fire each of a plurality of flash tubes each of which forms part of a control unit such as shown in FIG. 1. The forward window is defined as being the second half of each negative half-cycle period, e.g. (13–15) and in the example shown, during the first such half of 30 v pulse appears at 17 followed by a 15 v pulse 19. During the second half of subsequent half-cycles, two 15 v pulses are shown to appear at 21, 23 and 25, 27.

The action of the bistable 22 of FIG. 1 is to store pulse 17, at which point the tube (10) is triggered, until pulse 19 appears when a 30 v pulse is generated and this is transferred via the circuit output (44) to the next circuit input (26) where it triggers its associated tube (10) and is stored in a similar manner until the next pulse 21 arrives. The second circuit then generates a 30 v pulse which is transmitted to the next circuit and so-on, the process being repeated with the arrival each 15 v pulse—the next of which in the sequence are shown at 23, 25, 27.

If the frequency of the supply is 50 Hz, pulses such as 19, 21, 23 need to appear so soon after the firing pulse 17, unless a very fast sequence of operation is required, (as may be the case if the sequence of flashes is intended to simulate a flash of lightning, for example). For slow switching, the pulse 17 may for example not appear until some large number of cycles of the supply waveform have passed, with similar long gaps between 19 and 21, 21 and 23 etc.

FIG. 2(b) shows similar pulses in the other channel (as defined by the first half of each negative half cycle of the supply waveform). The same considerations apply, as for those during the second half of each half cycle, except that circuits such as shown in FIG. 1 cause the first firing pulse 29 to be transferred rapidly from one circuit to the next until the last circuit in the line is reached where the pulse is stored in the bistable device 24 and the tube (10) associated with that last circuit is caused to fire. The next clock pulse 33 releases the bistable device and a "reverse" firing pulse is generated and transmitted by (60) to the output of the preceding circuit (as previously described). This causes the tube associated with that preceding circuit to fire and so-on, as each succeeding pulse 35, 37 etc is received.

The pulse trains shown in FIGS. 2(c) and 2(b) will produce similar effects, but with the sequence of flashes starting at one end or the other of the chain.

The pulse trains of 2(b) and (c) may both be applied simultaneously to the input of the first control unit in a chain of circuits, which will produce two sequences of flashes simultaneously travelling in opposite directions from the two ends of the chain—both at the same speed.

FIG. 2(d) a combination of two such sets of pulses might look and also shows how one set of pulses may be different from the other—in this case those in the forward channel (the second half periods) being at one third the rate of those in the reverse channel (the first half periods). In this case the flashes moving from the beginning to the end of the chain will travel at one third the speed of the flashes returning from the end of the chain to the beginning.

Figure 3:
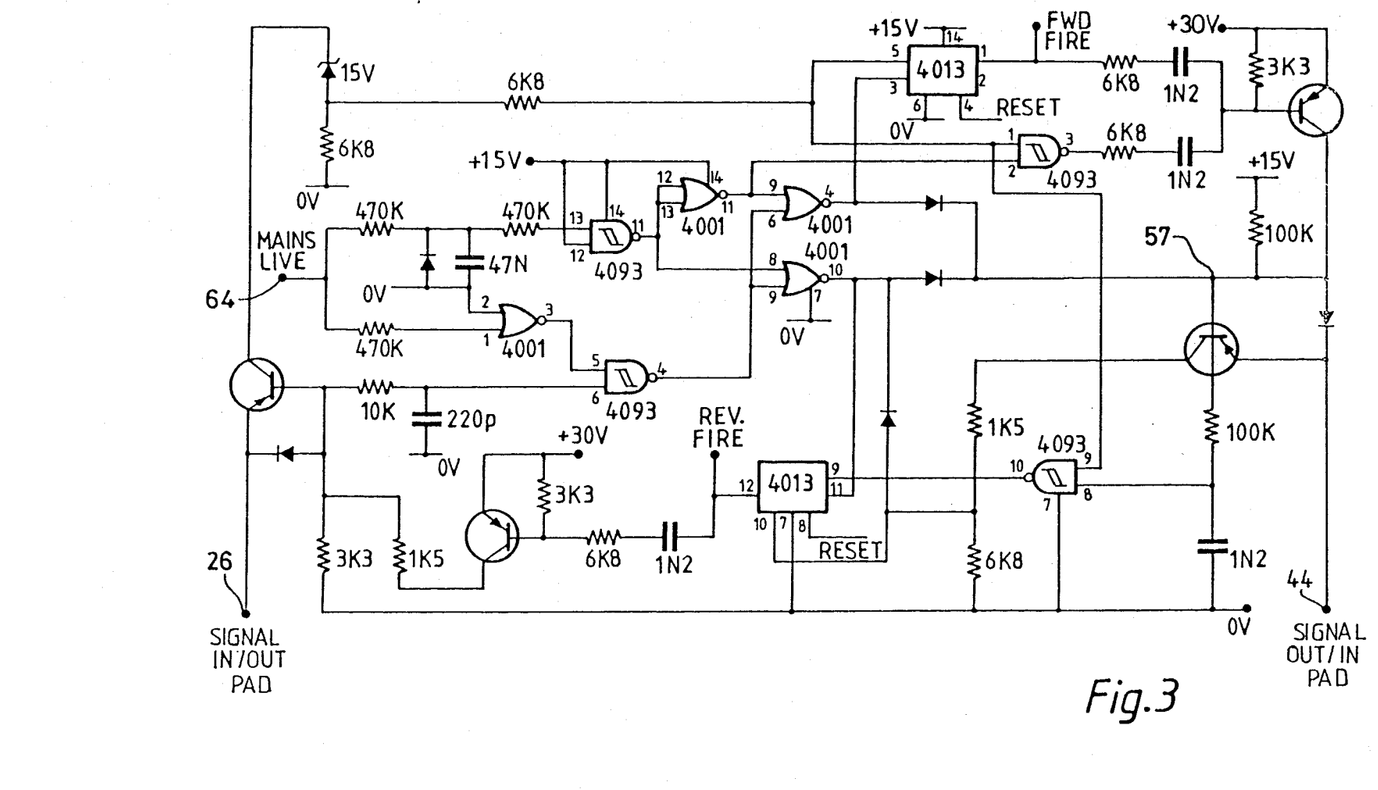
FIG. 3 is a circuit diagram of part of the control unit of FIG. 1.
Figure 4:
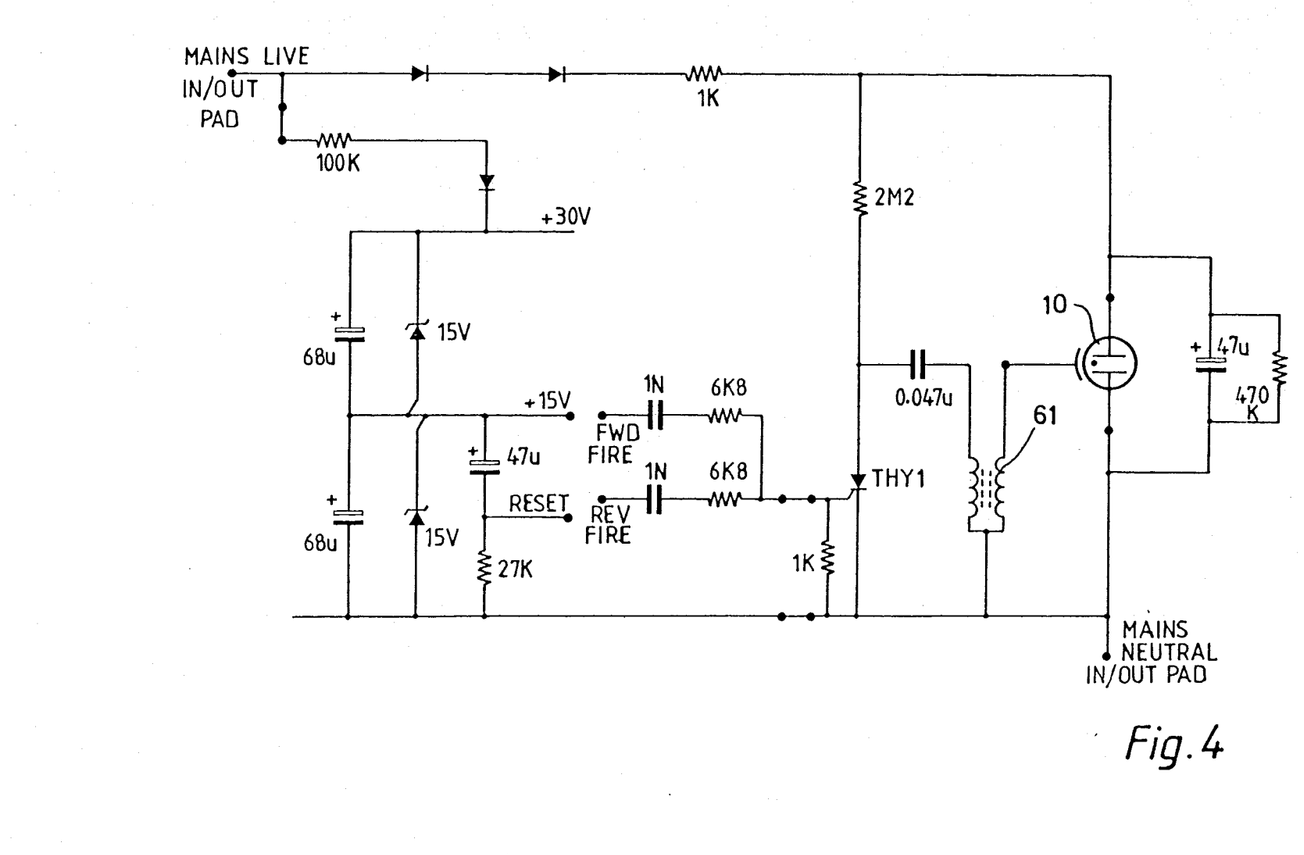
FIG. 4 is the remainder of the circuit diagram of the control unit of FIG. 1.

FIGS. 3 and 4 show how FIG. 1 can be implemented. In the preferred circuit P1 allows any pulses (whether 15 v or 30 v) at 26 to be transferred to a NAND gate IC2-B but only the 30 v pulses pass zener diode ZD3 to the DATA input of a shift register IC3-A and one input of NAND gate IC2-A.

NOR gate IC1-A and NAND gate IC2-B restrict the passage of any pulses other than those occurring durng negative excursions of the alternating current supply (the live side of which is connected to terminal 64) and NOR gates IC1-B and IC1-C operate as a toggle in response to changes in the output of NAND gate IC2-D, which by virtue of the RC circuit formed by R10 and C9, changes state of the maximum negative value of each negative going excursion of the supply voltage.

In this way pulses from IC2-B are routed through IC1-B during the second half of each negative going half-cycle and through IC1-C during the first half of each negative going half-cycle. In this way the two sets of clock pulses (which may include clock pulses derived from firing pulses, since these will also pass through IC2-B) are separated for supply to the clock inputs of the two bistable devices 22 and 24 of FIG. 1 (IC3-A and IC3-B in FIG. 3). Note R12 and C8 delay the appearance of the clock pulses so generated to ensure that any firing pulse will have been established at the Data input of the bistable IC1-B, IC3-A before the clock pulse is applied thereto.

Diodes D7 and D8 combine the separated pulse trains for supply to the output junction 44 via diode D9.

The forward voltage drop of D9 when conducting inhibits the transfer of any pulse at 44 via P3 to the RESET input of IC3-B.

On the contrary, any large 30 v positive pulse appearing at 44 is blocked by diode D9 but through P3 appears at the Reset input of IC3-B.

Thus only "returning" firing pulses can in general cause IC3-B to be Reset via P3 and R18, R19.

The action of P1 and D4 is similar to that of P3 and D9. "Reverse" direction firing pulses from P2 can transfer via D4 to the input terminal 26 for transfer, to the output of the preceeding circuit in the chain but cannot re-enter the circuit at ZD3 as firing pulses.

The arrival of a 30 v pulse at 26, results in not only a pulse appearing at input 6 by IC2-B but also the transfer of a part of the pulse (approximately 15 v of it if ZD3 has a 15 v breakdwon voltage) to the DATA input 5 of IC2-A. This causes IC3-A O output to go HIGH, since the routing circuit associated with gate IC3-B etc introduces (by virtue of R12 and C8) sufficient delay in the clocking signals for IC3-A and IC3-B to ensure that the DATA input has gone HIGH before the clock pulse appears.

This Low to High transition of O triggers THY1 (see FIG. 4) to fire the tube 10 (FIG. 4) via coil 61. Energy for the flash is stored in a capacitor C2 which is kept charged by a half-wave rectifying circuit D1, D2 connected to the live of the supply.

Power for the circuit of FIG. 3 is derived via a second rectifying diode D3 and voltage stabilizing and dividing zener diodes ZD1 and ZD2, which, with capacitors C3, C4 provide 30 v and 15 v supplies. A Reset on switch-on signal is obtained via capacitor C5.

A 30 v pulse 26 will therefore cause tube 10 to fire.

Also, in accordance with what has so far been described, the arrival of a 30 v reverse firing pulse at 44 (from the following circuit) will also, trigger the tube 10 and produce a corresponding pulse to appear at the input terminal 26, for "backward" transmission to the next preceeding circuit, when the next reverse clock pulse arrives.

IC2-C serves as a signal path for incoming 30 v pulses at 26 to be routed back to the DATA input of IC3-B if the circuit is the last one in the chain, and prevents any such routing back, if the circuit is not the last one in the chain. This is achieved by virtue of the fact that the voltage across C12 will be very small (of the order of 1 v) if the output terminal 44 is connected to an input terminal (sucha as 26) of another circuit (due to the effect of the transistor P1 and resistor R9 of the input of the next circuit). However, in their absence, the voltage on C12 can rise towards the 15 v rail, via R22 and R24. Only if this is the case can 15 v pulses at the other input of IC2-C produce a low output from IC2-C and which are the conditions needed to produce a LOW to HIGH transition in the $\overline{O}$ output of IC3-B.

As with IC3-A, such a transition (brought about by the coincident clock pulse to arrive at IC3-B) will produce a triggering of THY1 (FIG. 4), via C7, R7.

Tracing the path taken by different signals arriving at 26:

(a) a 30 v pulse during a forward window (=the second half of the negative half-cycle) will latch IC3-A by the coincident clock pulse derived therefrom and fire the tube 10.

(b) a subsequent 15 v pulse occuring during the same (or a following) "forward" window resets IC3-A, and via P4 delivers a 30 v pulse to D9; and if 44 is connected to a following input 26, the 30 v pulse from D9 will repeat the process in the following circuit and its tube will be fired.

(c) a 30 v pulse during a "reverse" window (=the first half of the negative half cycle) will not cause IC3-A to latch but will transfer directly via NAND gate IC2-A to P4, to appear immediately at the next circuit input and so on, until the last circuit is reached. Here, the high voltage on C12 will cause IC2-C output to fall LOW and cause the $\overline{O}$ output of IC3-B to go High on the arrival of the coincident clock pulse from IC1-C As previously described, the next 15 v pulse in a "reverse" window will cause IC3-B $\overline{O}$ output to go low, causing a 30 v pulse to be generated by P2 for transmission via D4 to the preceding circuit output;

(d) whichever the "window" they occur in, all pulses occurring during the negative half cycle are routed immediately to the output 44 either via IC1-B and D7 or IC1-C and D8.

Figure 5:
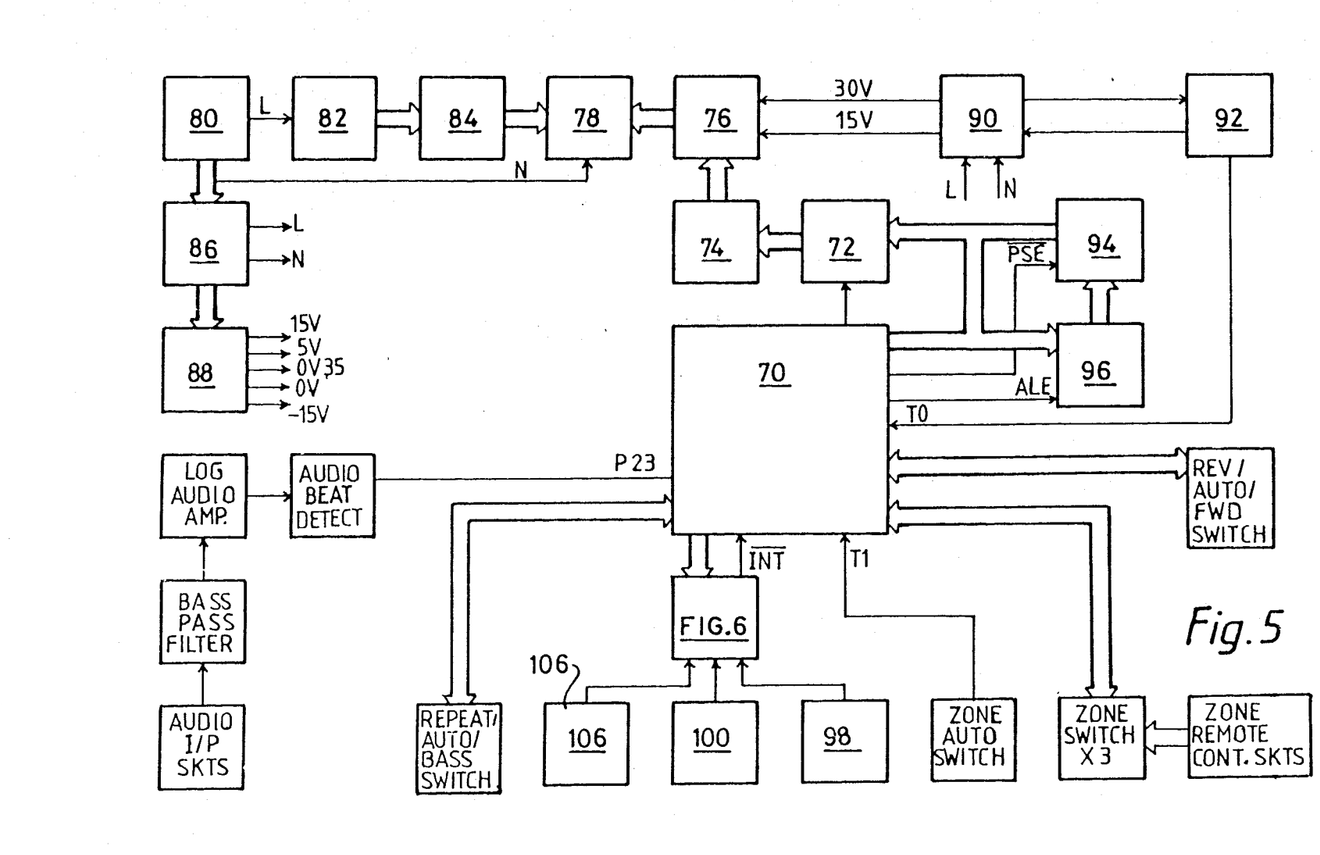
FIG. 5 is a block schematic diagram of a control signal source for use with a chain of control units such as shown in FIGS. 1 to 4.

In FIG. 5 a microprocessor 70 produces pulses (via a 4-Bit latch 72, opto-isolation 74 and tube control driver circuits 76) at the data output terminals of each of 3 separate zone output sockets (not shown) in 78.

The supply main is fed via noise suppression circuits 80 to zone fuses 82 and switches 84 to the L and N terminals of the zone output sockets.

In addition the mains supply is connected to the mains switch and fusing circuits 86, for subsequent supply to the control units via the L and N leads (see FIG. 3), and to a power supply 88 for the microcomputer and ancilliary equipment.

The L and N lines also provide the a.c. input to a power supply 90 which provides 15 v and 30 v to the circuits 76, and is linked to a synchronous detector 92 for supplying synchronising pulses corresponding to the a.c. waveform zero crossing points, to the microcomputer controller.

The operation of the latter is governed by an operating system stored in an EPROM 94 which connects with the main Data Bus and the address latch 96.

Figure 6:
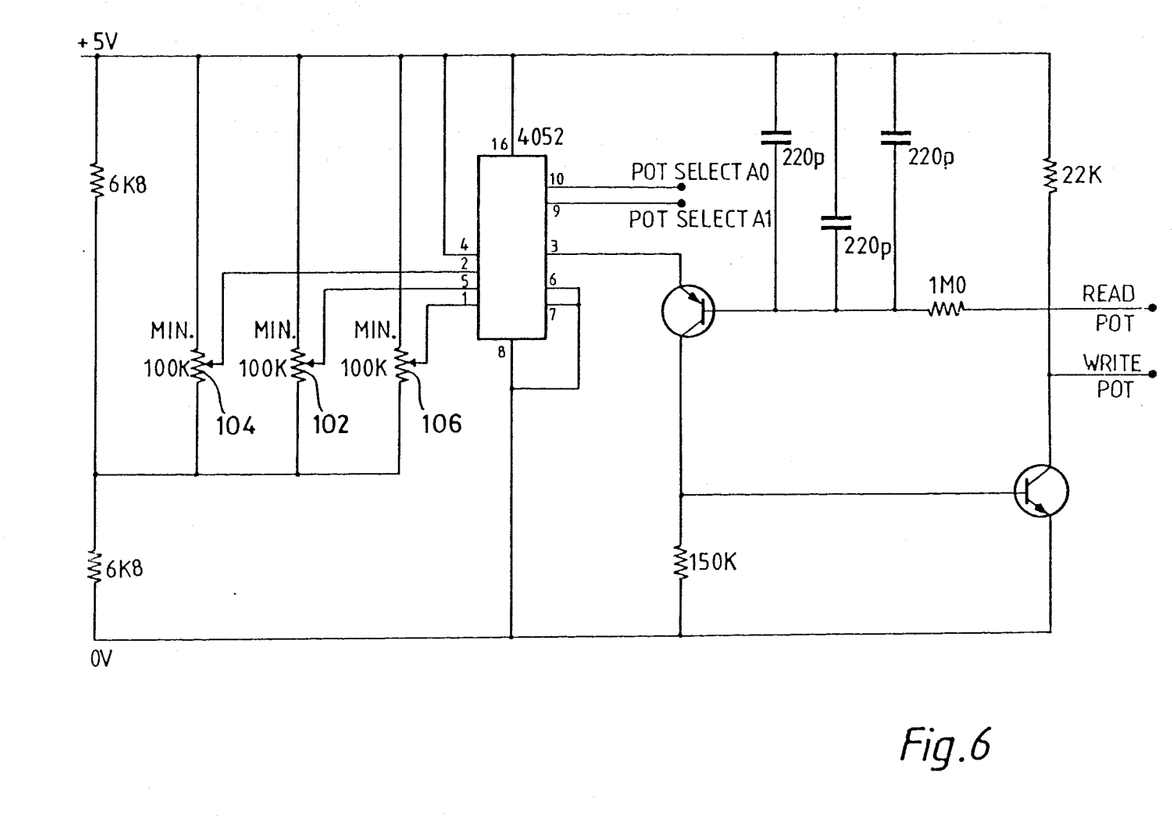
FIG. 6 is a circuit diagram of part of the source of FIG. 5.

The rate at which the "forward" or "reverse" pulses are generated, is governed by rate controls 98 and 100. Detail of these controls is given in FIG. 6. Thus the setting of potentiometer 102 determines an analogue voltage on pin 5, and potentiometer 104 setting, that on pin 2, of IC2 (FIG. 6). IC2 multiplexes these values under the control of signals on pins 9 and 10 from the microprocessor 70 and P10 which acts as a timing circuit and in conjunction with the microprocessor 70 and N7 supplies time intervals and therefore numbers of pulses to the processor 70, the number of which are related to the values set up on 102 and 104.

A third potentiometer 106 sets a third voltage on pin 1 of IC2 (FIG. 6), which in a similar manner to that described with reference to 102, 104, sets the repeat repetition rate—i.e. the rate at which forward and reverse firing pulses are generated under auto repeat mode operation.

Alternative modes of operation are governed by other controls by which the operation of microprocessor 70 is governed but these are not described herein as they are not relevant to the invention.

The flash tubes and associated control circuits may be located at intervals along the length of a flexible plastics tube, which may be coloured or clear. Each control circuit is connected to the Live and Neutral conductors of the supply main and a data cable connects each output to each input to form the chain. The first input is connected to the data output terminal of one of the three zone output sockets of the main control unit of FIG. 5—the Live and Neutral terminals of the same zone socket provide the power for the charging circuits of the flash tubes and for the power supplies for the control circuits.

Since the last control circuit in the line will identify itself as such to incoming pulses, no special termination of the L, N and data leads is required. Furthermore, if any tube or associated control circuit develops a fault, it can be simply taken out of circuit (even if it is the last one), by simply disconnecting the leads to it and joining the output of the preceeding control unit to the input of the next following unit. The L and N conductors will be carried through automatically upon appropriate interconnection.

What is more, a first length of such tubing can be simply extended by connecting the L, N and data output of the last unit in the first chain to the L, N and data input of the first unit in the second chain.

It is to be understood that the microprocessor based controller of FIGS. 5 and 6 may be replaced by an appropriate plurality of independently adjustable, synchronised pulse generators, feeding into a common data line.

I claim:

1. An electrical switching system comprising a power supply, a source of control signals of differing characteristics, a plurality of appliances each of which is connected in parallel with the other appliances and the power supply, and a single wire linking the appliances to the source of control signals for selectively operating the appliances, the system also comprising for each appliance, a control unit powered from the power supply, and an input terminal and an output terminal whereby the control units are connected in series with the output terminal of one control unit being connected to the input terminal of the next and the input terminal of the first control unit being connected to the source of control signals, no connection being made to the output terminal of the last control unit in the chain, and wherein each control unit includes discriminating means and routing means whereby electrical signals having one characteristic can be distinguished from and routed separately from electrical signals having a differing characteristic, thereby to cause a signal having a particular characteristic to actuate only a selected one or ones of the appliances, wherein said routing means comprises bi-state circuit means arranged to route a signal of a first characteristic from the input to the output of a unit, for triggering the bi-state circuit means into one mode, whereby the arrival at the routing means of a subsequent signal of a second characteristic triggers the bi-state circuit means into its other mode, and means whereby triggering of the bi-state circuit means into its other mode causes operation of the appliance associated with the unit and generation of a signal of the first characteristic for transmission from the output of the unit to the input of the next unit.

2. A system according to claim 1, including means whereby the electrical control signals are distinguished according to one of amplitude and frequency.

3. A system according to claim 1, wherein the routing means also includes circuit means whereby pulses of the second characteristic are instantaneously routed by each control unit directly from input to output so that these subsequently occurring signals are applied simultaneously to all of the appliances along the chain.

4. A system according to claim 3, wherein each control unit includes discriminator means for distinguishing between at least two different types of first amplitude signal on the basis of phase, and the routing means comprises circuit means whereby a first amplitude signal of one phase is routed through the bistable device but a first amplitude signal of a different phase is routed directly from input to output of the control unit in the same manner as the said subsequent second amplitude signals.

5. A system according to claim 1, wherein each control unit includes circuit means which recognises whether or not a subsequent control unit has been connected to the output thereof, and the last control unit in the chain has routing means which includes circuit means whereby the arrival of a second characteristic signal at said last unit causes the re-generation of a first characteristic signal within the last unit, which is then caused to be transferred from one unit to the next in the reverse direction along the chain to return to the source of control signals, in a series of steps dictated by the arrival of successive signals of said second characteristic.

6. A system according to claim 1, wherein the control unit also includes discriminator means for distinguishing between subsequent second amplitude pulses of one phase and subsequent second amplitude pulses of another phase, whereby the said subsequent second amplitude pulses of said one phase cause a first amplitude pulse of a first phase to be moved in an outward direction along the chain, and second amplitude pulses of said another phase cause transfer of a first amplitude pulse of a second phase, which has been transmitted though the units to the far end of the chain, to be moved unit by unit back along the chain towards the source of control signals.

7. A system according to claim 1, constituted by a lighting system wherein each appliance comprises a gas filled discharge tube having a flashtube and a large electrical capacitor which is maintained in a charged state by permanent connection to the power supply via a charging circuit, and the control unit includes means for generating a trigger signal for the flashtube associated with the appliance when a first amplitude pulse is received by said control unit which, in accordance with the routing and discrimination circuitry in the control unit, is identified as being a pulse which is to cause the associated lamp to flash.

8. A system according to claim 1, wherein the source of control signals comprises at least one signal generator and means for adjustment thereof to produce controlled amplitude pulses at particular repetition rates and accurately phased one relative to another.

9. A system according to claim 1, wherein the source of control signals comprises a clock-controlled microprocessor, microprocessor controlled device in which digital or analogue numerical values determine the repetition rate of pulses delivered by the clock-controlled microprocessor, and a memory containing an operating system of commands, and operable switch means for selecting the commands.

10. A method of sequentially operating one or more of a plurality of appliances interconnected by a common signal line which includes appliance-controlling devices connected in series, comprising the supplying of electrical pulses of a first type during a first period of time and routing each of said first type pulses in steps through each of the series connected appliance-controlling devices by the subsequent application of timing pulses to the signal line during a second period of time, which timing pulses are arranged to occur in a strict phase relationship to the first type pulses and to each other, whereby different units are selected by a process of time multiplexing in which a second period of time is defined which is fixed in time relative to the first period of time and a second control signal is transmitted during the said second period of time, the second control signal being caused to transfer from one unit to the next upon the application of the timing pulses during said second period of time and during subsequently recurring second periods of time, each of which is strictly phase related to the first occurring second period and likewise phase related to each subsequently occurring second period of time.

11. A method according to claim 10, wherein a sinusoidal alternating current mains is employed as a standard of reference and each whole cycle of the sinusoidal waveform is divided into a power cycle corresponding to the positive-going excursion of the supply voltage and a control signal cycle, which is arranged to occur simultaneously with the negative going excursion of the supply voltage.

12. A method according to claim 11, wherein the positive-going excursions are channelled via diodes to charge capacitors and provide direct current both as a power supply for circuit means associated with each appliance-controlling device and as a source of power for the appliance which is to be driven from the power leads.

13. A method according to claim 12, in which appliances do not draw current during the negative going half cycle of the alternating current supply, and the neutral lead is used as the return for a control signal supply line, separately supplying control signals to each of the plurality of appliance-controlling devices each of which is associated with one of the appliances.

14. A method according to claim 13, wherein a synchronising circuit means accurately defines the periods of time within which the negative half cycles of the mains supply occur and a further toggle circuit divides the negative half cycle period into two equal parts, with the division occurring at the maximum negative excursion of the mains voltage, whereby two channels of information can be supplied, one during the first half of the negative-going half cycle and the second during the second half of each negative-going half cycle.

15. A system according to claim 2 wherein said bistate circuit is a bistable device triggered into said one mode by a signal having a first amplitude and its other mode by a subsequent signal having a second amplitude.

* * * * *